United States Patent [19]

Takahashi et al.

[11] Patent Number: 4,789,899

[45] Date of Patent: Dec. 6, 1988

[54] LIQUID CRYSTAL MATRIX DISPLAY DEVICE

[75] Inventors: Shingo Takahashi; Seiji Sanada; Sakae Tanaka; Kazuya Umeyama, all of Tokyo, Japan

[73] Assignee: Seikosha Co., Ltd., Tokyo, Japan

[21] Appl. No.: 2,816

[22] Filed: Jan. 13, 1987

[30] Foreign Application Priority Data

Jan. 28, 1986 [JP] Japan .................................. 61-16520

[51] Int. Cl.⁴ .......................... H04N 5/70; G09G 3/36

[52] U.S. Cl. ...................................... 358/236; 358/241

[58] Field of Search ................ 358/236, 241; 340/784, 340/811, 825.89, 825.91

[56] References Cited

U.S. PATENT DOCUMENTS 4,427,978 1/1984 Williams .............................. 358/236
4,622,590 11/1986 Togashi .............................. 358/241
4,652,872 3/1987 Fjuita .................................. 358/241

*Primary Examiner*—Tommy P. Chin
*Attorney, Agent, or Firm*—Bruce L. Adams; Van C. Wilks

[57] ABSTRACT

The present invention comprises a selective supply of image signals and a desired direct current potential to picture elements during each period of field scanning, whereby flickering and shading unevenness are prevented.

13 Claims, 4 Drawing Sheets

LIQUID CRYSTAL MATRIX DISPLAY DEVICE

BACKGROUND OF THE INVENTION

The present invention relates to a liquid crystal matrix display device such as used for a television display.

Liquid crystal televisions have recently been commercialized and the demand for them has rapidly increased. In general, NTSC-type television broadcasting is received by liquid crystal televisions, but in this type of broadcasting, 60 fields are transmitted per second and when the polarity of an image signal is reversed for each field in order to drive the liquid crystal with alternating current, the liquid crystal is subjected to a 30 Hz drive.

Generally, if a liquid crystal is not driven above 40 Hz, flickering is produced quite strikingly.

For this reason, an art for eliminating flickering has been proposed, which is disclosed in Japanese Patent Laid-Open No. 15338/1984. In this art, a single polarity image signal and a given potential of direct current are supplied to a picture element alternatively while switching them for each field. Consequently, an image signal to be supplied has a single polarity, and thus it is possible to restrain the production of flickering.

However, the above-mentioned art has a disadvantage in that shading irregularity occurs between the upper and lower portions of a picture. In other words, as regards to the picture elements in the upper portion of a picture, a signal is written on a source line immediately after switching to an image signal or direct current and the source line is then held in the signal switched state, and thus the amount of leakage of charges stored in the picture elements to the source line is relatively small and does not lead to any significant problem. As regards those in the lower portions of a picture, however, either an image signal or direct current is written on the source line at the end of a field scanning and the source line is thus switched to an image signal or direct current, and the potential of the charges stored in the picture element is therefore greatly different from that of the source line, and leakage of the charges results. Furthermore, since this leakage of the charges continues for a period of time which is substantially equivalent to one field, it is impossible to reproduce a true image in the lower portion of a picture, whereby shading unevenness is produced as between the upper and the lower portions of a picture.

DETAILED DESCRIPTION OF THE PREFERRED EMBODIMENT

Figure 1:
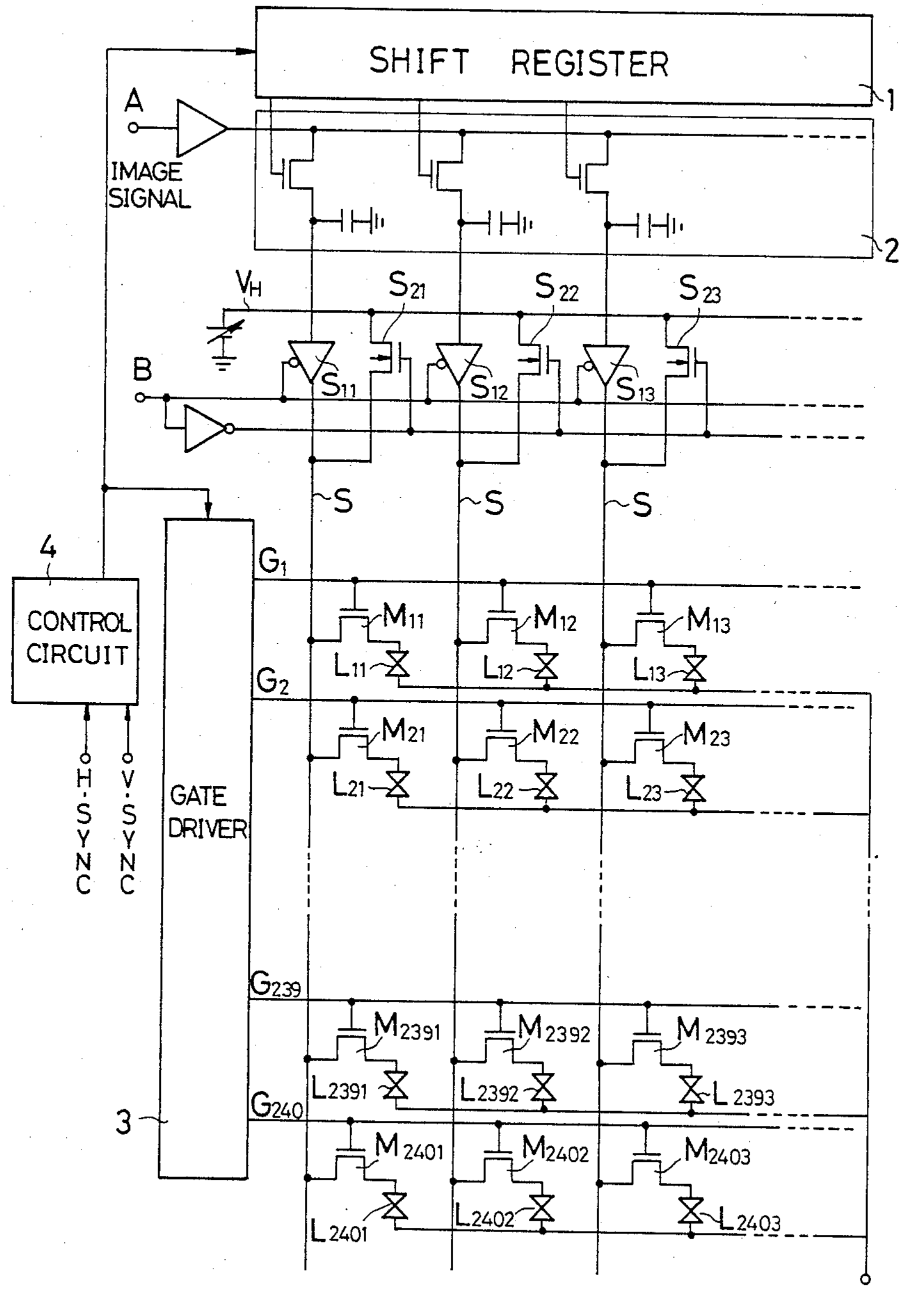
FIG. 1 is a drawing of an electrical circuit showing an embodiment of the present invention.

In FIG. 1, reference numeral 1 denotes a shift register for selecting a source line; or column electrode reference number 2 denotes a sample hold circuit for holding image signals; and $S_{11}$, $S_{12}$ . . . $S_{21}$, $S_{22}$ . . . denotes switching elements for selectively supplying an image signal and a desired direct current potential $V_H$ to a source line S. Reference number 4 denotes a control circuit for controlling timings. $L_{11}$, $L_{12}$ . . . denote picture elements arranged in a matrix of rows and columns and $M_{11}$, $M_{12}$ denote switching elements series-connected to corresponding picture elements.

Figure 4:
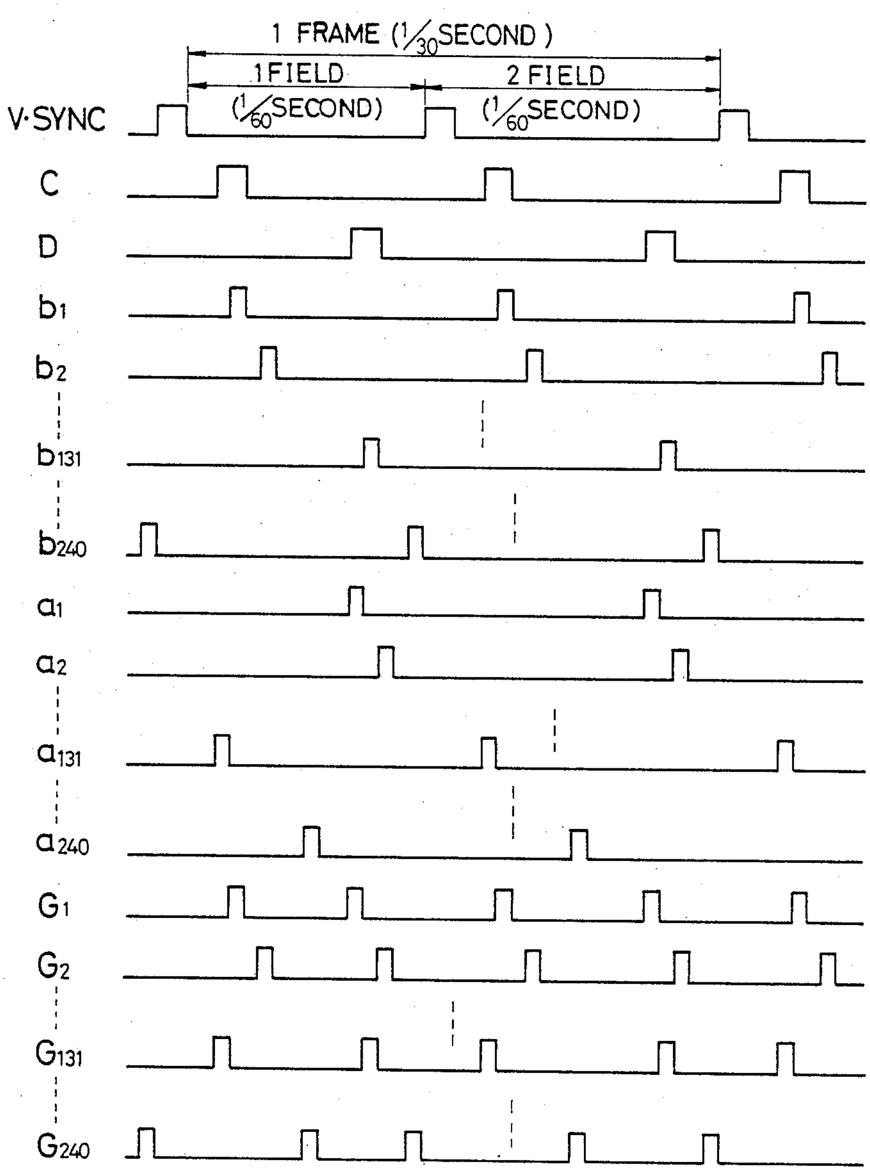
FIG. 4 shows time charts depicting the operations of the logic circuit shown in FIG. 3.

Operations will be described hereinafter with reference to the time charts shown in FIG. 2. Vertical synchronizing signals (v. SYNC) and horizontal synchronizing signals (H. SYNC) shown in FIG. 4 are supplied to the control or synchronizing circuit 4 and timing signals output from this control circuit control the operations of the shift register 1 and the gate driver 3. Firstly, image signals are subjected to sample-holding in the sample-hold circuit 2 each horizontal scanning by the output from the shift register 1. These image signals are supplied to the buffer amplifiers $S_{11}$, $S_{12}$ . . . .

On the other hand, a predetermined signal in the form of a desired direct current potential $V_H$ is supplied to the switching elements $S_{21}$, $S_{22}$ . . . . This direct current potential and the image signals are supplied to the source line or column electrode S while they are being switched once during each period of horizontal scanning by means of the pulse B shown in FIG. 2. Namely, when a logic level of a terminal B is "1", the direct current potential $V_H$ is supplied to the source line S, and when it is "0", image signals are supplied thereto.

The signal output from the source line is written in each picture element to drive the same by means of scanning signals from the gate driver 3, as described below. The gate driver 3 applies scanning signals shown by $G_1$, $G_2$ . . . in FIG. 2 to gate lines or row electrodes $G_1$, $G_2$ . . . , and the image signals and the direct current potential $V_H$ are respectively written in each picture element once during each field scanning period by means of these scanning signals.

Figure 2:
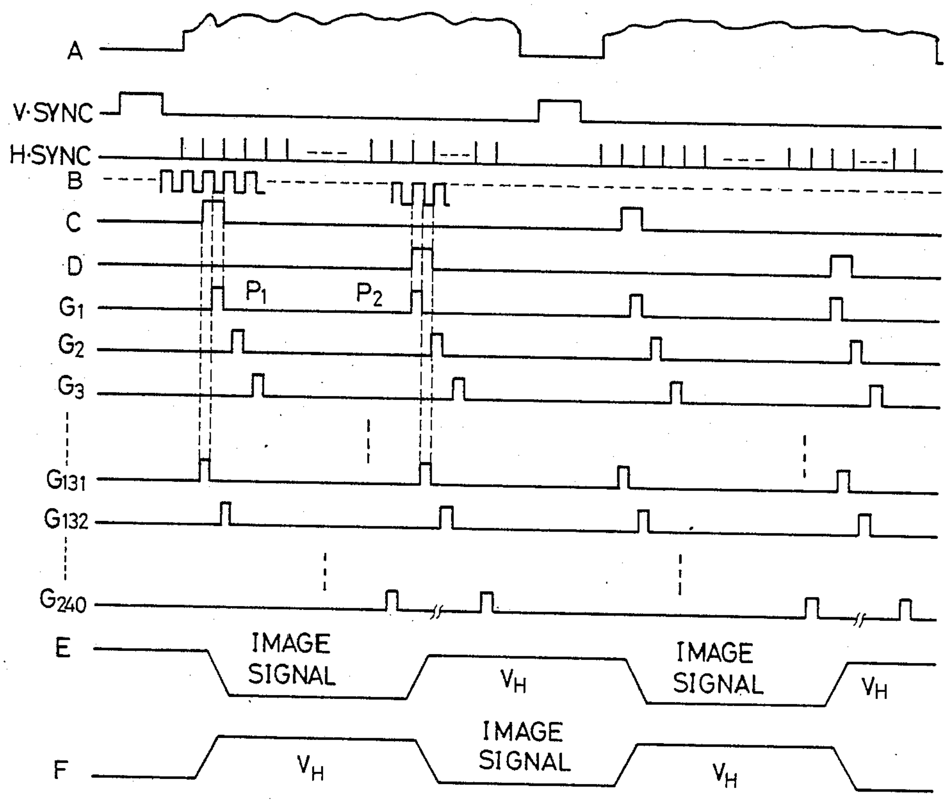
FIG. 2 shows time charts depicting the operations of the circuit shown in FIG. 1.

A pulse $p_1$ of the scanning signal $G_1$ shown in FIG. 2 is generated in synchronization with an image signal writing start pulse C shown in FIG. 2 which is output from the control circuit 4. Since this pulse $p_1$ is generated at a timing at which image signals are supplied to the source line S to select the first gate line $G_1$, the image signals are written in the first row of picture elements $L_{11}$, $L_{12}$, $L_{13}$ . . . in parallel.

In a similar manner, pulses of the scanning signals $G_2$, $G_3$ . . . shown in FIG. 2 are sequentially applied to the gate lines $G_2$, $G_3$, . . . $G_{130}$ in synchronization with the generation of image signals and the image signals are sequentially in the rows of picture elements corresponding to the gate lines $G_2$, $G_3$ . . . $G_{130}$.

On the other hand, pulses are applied to gate lines $G_{131}$ . . . $G_{240}$ immediately before the pulses are applied to the gate lines $G_1$ . . . $G_{130}$ (at the timings at which the direct current potential $V_H$ is supplied to the source line S), as shown in FIG. 2, thereby the direct current potential $V_H$ is sequentially in the rows of the picture electrodes corresponding to the gate lines $G_{131}$ to $G_{240}$.

In such a manner, image signals are written in the rows of picture elements corresponding to the gate lines $G_1$ to $G_{130}$ and the direct current potential $V_H$ is written in the rows of picture elements corresponding to the gate lines $G_{131}$ to $G_{240}$, in the first half of each field scanning period.

When the above-described writing is completed, a pulse $p_2$ of the first scanning signal $G_1$ shown in FIG. 2 is applied to the gate line $G_1$ in synchronization with the writing start pulse D for the direct current potential shown in FIG. 2 at the timing at which the direct current potential $V_H$ is supplied to the source lines S. The direct current potential $V_H$ is written in the first row of picture elements corresponding to the gate line $G_1$ by means of this pulse $p_2$ at a different timing than the timing at which the image signals are applied to the first row of the picture elements. In a similar manner, the direct current potential $V_H$ is sequentially written in the rows of picture elements corresponding to the gate lines $G_2, G_3, \ldots G_{130}$ in the second half of each field scanning period.

On the other hand, image signals are sequentially written in the rows of picture elements corresponding to the gate lines $G_{131}$ to $G_{240}$.

Therefore, when one picture element is selected twice during one field scanning period, the image signal and the direct current potential $V_H$ are written in the picture element each time while they are being switched during each field scanning period.

Thus, it is substantially possible to effect a 60 Hz drive and to eliminate all flickering.

In FIG. 2, E denotes a signal to be written in the picture elements connected to the gate line $G_1$ and F denotes a signal to be written in the picture elements connected to the gate line $G_{131}$.

Since the source lines S are switched to the image signals or the direct current potential during the period of one horizontal scanning in response to the signal B as shown in FIG. 2, the charge stored in each picture element does not substantially leak at all and the picture elements in the upper and the lower portions of the picture element matrix are under the same condition so that no shading unevenness is produced.

Figure 3:
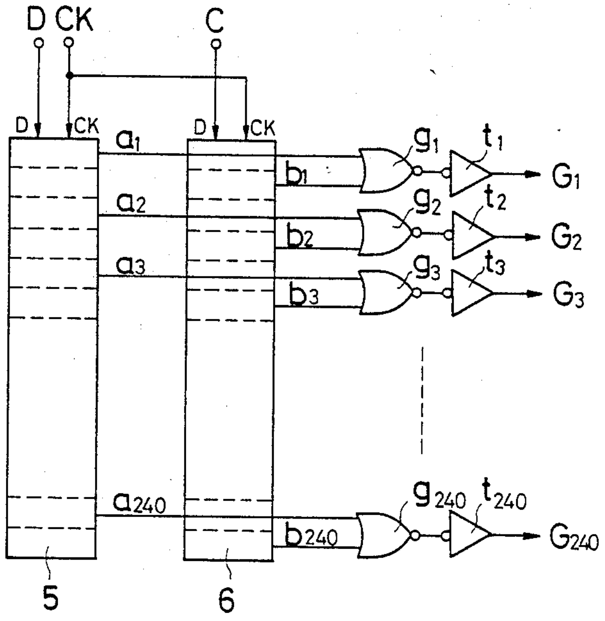
FIG. 3 is a drawing of a logic circuit showing detailed parts of the circuit of FIG. 1.

The detailed configuration of the gate driver 3 is described below with reference to FIG. 3. In the drawing, reference numbers 5 and 6 denote respective shift registers of 480 bits each; outputs only in odd number steps are derived from the shift register 5 and those only in even number steps are derived from the shift register 6. In addition, the writing start pulses C, D (which are the same as C, D in FIG. 2) for starting the application of the image signals and the direct current potential are supplied to the shift registers 5, 6, respectively.

480 clock pulses are supplied to the clock input CK of each shift register 5, 6 during each period of field scanning. Thus, pulses $b_1$ to $b_{240}$ shown in FIG. 4 are generated from the terminals $b_1$ to $b_{240}$ of the shift register 6 and pulses $a_1$ to $a_{240}$ shown in FIG. 4 are generated from the terminals $a_1$ to $a_{240}$. As the gate circuits $g_1$ to $g_{240}$ and the inverters $t_1$ to $t_{240}$ receive these pulse signals, they generate the pulses $G_1$ to $G_{240}$ shown in FIG. 4 which are respectively supplied to the gate lines $G_1$ to $G_{240}$, the pulses shown in FIG. 2 thereby being obtained.

In the above description, the ratio of the image signal time to the direct current potential time is 1:1, but the ratio is not limited to this value and it may, for example, be set to about 2:1.

Furthermore, it is possible to control brightness by making the direct current potential $V_H$ variable.

In the above embodiment, the gate lines comprise 240 lines, but in the case of 480 gate lines, it is possible to employ the present invention by doubling the speed of image signal, without any other change.

In addition, although the above embodiment relates to a black and white television, the present invention can also be applied to color televisions in a similar manner.

The present invention in which the image signal and the direct current potential are selectively supplied to the picture elements during the period of each field scanning is capable of providing a 60 Hz drive, and the drive frequency is doubled twice as that of the conventional drive in the case of the NTSC type. Any possible flickering is thus eliminated. This effect is particularly significant in the cases of the PAL and SECAM types in which the transmission speed is small. Since no flickering is produced, the composition of liquid crystal can be freely selected and it is possible to use a liquid crystal having high speed, high resistance, and high reliability.

In addition, all picture elements in the matrix are driven under the same condition and it is thus possible to display a picture of good quality without any shading being experienced. Therefore, the requirements relating to the leak current of switching elements is moderated.

Furthermore, image signals need not be inverted and a frame memory for double-speed scanning is made unnecessary, resulting in a simple circuit configuration.

What is claimed is:

1. In a liquid crystal display panel for performing a display during each field scanning period by sequentially supplying image signals to picture elements which are arranged in a matrix on said display panel, the improvement comprising: scanning means for scanning said picture elements twice during one field scanning period; and a control circuit for selectively supplying said image signals and a desired direct current potential to said picture elements to drive said picture elements twice during each field scanning period.

2. In a display apparatus having a plurality of picture elements arranged in a matrix of rows and columns and driven to display one picture during one field period in response to an image signal, the improvement comprising: scanning means connected to the rows of picture elements for scanning the same twice during one field period to thereby select each row of picture elements twice at two different assigned timings; and driving means connected to the columns of picture elements and operative to sequentially apply the image signal to each row of picture elements when selected at one of the two different assigned timings for driving the matrix of picture elements to display one picture during one field period and operative to sequentially apply a predetermined signal to each row of picture elements when selected at the other of the two different assigned timings for driving the matrix of picture elements during the same field period according to the predetermined signal so that the matrix of picture elements is driven twice during one field period according to the image signal and the predetermined signal to thereby prevent flickering of pictures displayed during successive field periods.

3. A display apparatus according to claim 2; wherein the scanning means includes dividing means for dividing the rows of picture elements into two groups of consecutive rows of picture elements to scan the two groups in parallel.

4. A display apparatus according to claim 3; wherein the dividing means includes means for scanning each of the two divided groups twice in the first half and second half of one field period.

5. A display apparatus according to claim 4; wherein the driving means includes means for applying the image signal to one of the two groups during the first half of one field period and to the other of the two groups during the second half of one field period, and means for applying the predetermined signal to said one group during the second half of one field period and to the other group during the first half of one field period.

6. A display apparatus according to claim 2; wherein the driving means includes generating means for generating the predetermined signal in the form of a DC voltage signal commonly applied to all of the picture elements.

7. A display apparatus according to claim 6; wherein the driving means includes means for receiving the image signal in the form of a serial image signal, and transforming means for transforming the serial image signal into a parallel image signal to assign the same to each row of picture elements.

8. A display apparatus according to claim 7; wherein the driving means includes switching means connected to the generating means and the transforming means for switching the DC voltage signal and the parallel image signal to selectively apply the DC voltage signal and the parallel image signal to each row of the picture elements at the two different timings.

9. A display apparatus according to claim 2; wherein the scanning means includes a plurality of row electrodes connected to respective rows of the picture elements, and the driving means includes a plurality of column electrodes connected to respective columns of the picture elements.

10. A display apparatus according to claim 9; wherein each of the picture elements comprises a liquid crystal cell and a switching element series-connected to the liquid crystal cell.

11. A display apparatus according to claim 2; including synchronizing means connected between the scanning means and the driving means for synchronizing the scanning of the rows of picture elements with the application of the image and predetermined signals to the columns of picture elements to thereby sequentially apply the image and predetermined signals to each designated row of picture elements when selected at the two different assigned timings.

12. A method of driving a display apparatus having a plurality of picture elements arranged in a matrix of rows and columns and driven to display one picture during one field period in response to an image signal, the method comprising the steps of: scanning the rows of picture elements twice during one field period to thereby select each row of picture elements twice at two different timings; sequentially applying the image signal to each row of picture elements when selected at one of the two different timings assigned thereto to drive the matrix of picture elements to thereby display one picture during one field period; and sequentially applying a predetermined signal to each row of picture elements when selected at the other of the two different timings assigned thereto to drive the matrix of picture elements during the same field period according to the predetermined signal.

13. A method according to claim 12; wherein the last-mentioned applying step comprises applying the predetermined signal in the form of a DC voltage signal commonly applied to all of the picture elements.

* * * * *